United States Patent Office 3,535,249
Patented Oct. 20, 1970

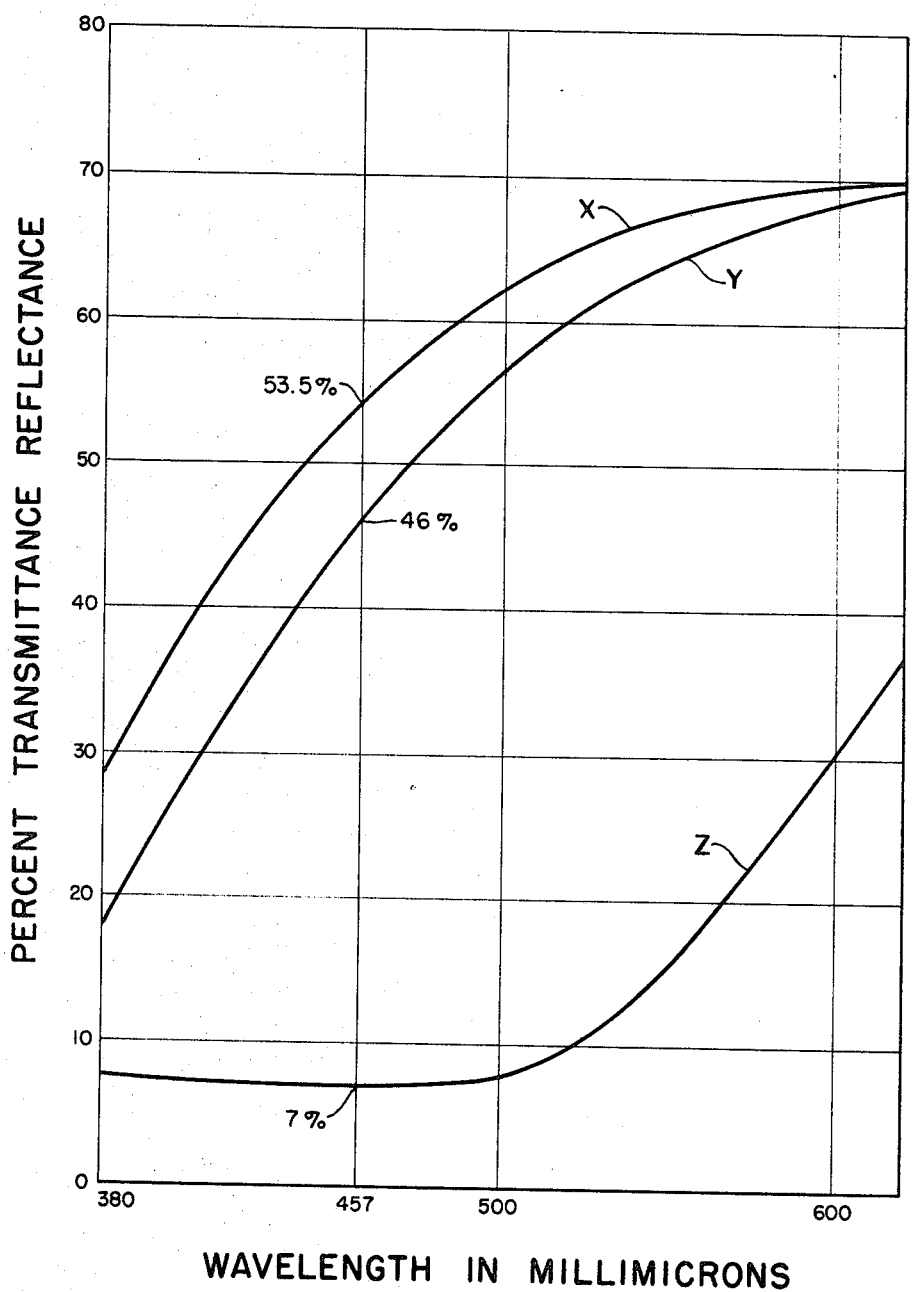

3,535,249
ANTIOXIDANT COMPOSITIONS, THEIR USE IN POLYMERS AND PRODUCTS MADE THEREFROM
Harry L. Larson, Akron, Ohio, assignor to The Goodyear Tire & Rubber Company, Akron, Ohio, a corporation of Ohio
Continuation-in-part of application Ser. No. 588,896, Oct. 24, 1966. This application July 31, 1967, Ser. No. 657,247
Int. Cl. C08c 7/10; C08d 7/10; C08f 45/54
U.S. Cl. 260—23
22 Claims

ABSTRACT OF THE DISCLOSURE

A stabilization system for polymers comprising a phenolic antioxidant, a heavy metal ion neutralizer and a reducing agent, said polymers being used in products such as pneumatic tires.

---

This is a continuation-in-part application based on application Ser. No. 588,896, filed Oct. 24, 1966 and now abandoned.

This invention relates to nondiscoloring antioxidant compositions, polymers containing such compositions and which possess increased resistance to discoloration and oxidation, and products made from such polymers.

Many antioxidants are known which are capable of protecting polymeric materials against degradation due to attack by oxygen. In recent years a need has developed for antioxidants which themselves do not discolor the polymer to which they are added and which also prevent later formation of color in the polymer. Such antioxidants are particularly needed when the polymer or a product made therefrom is to be exposed to high temperatures. Various nondiscoloring antioxidant compositions have been developed which offer some protection in the areas of oxygen degradation and discoloration. However, a need for improvement in both areas exists.

It is an object of this invention to provide an improved nondiscoloring antioxidant composition for polymers. It is a further object of this invention to provide polymers possessing increased resistance to discoloration and oxidation. Another object of this invention is to provide improved products made from such polymers. A particular object is to provide improved stabilization compositions for polymers which are most effective when stabilizing such polymers in latex form or in stabilizing films or coatings deposited from latex. A still further object is to provide a relatively inexpensive and effective stabilization composition. Other objects will appear as the description proceeds.

Some of the above objects are accomplished by providing a stabilization composition comprising (a) at least one phenolic antioxidant, (b) at least one neutralizer that will neutralize the effect of heavy metal ions and (c) at least one reducing agent. Other objects are accomplished by incorporating the stabilization compositions into the polymers either by way of latex compounding or dry compounding. Still other objects are accomplished by coating or impregnating a substrate with a latex containing the improved stabilization composition.

It has been found that any phenolic antioxidant may be employed in the practice of the present invention. Representative examples of these are 4,4'-butylene bis (3-methyl-6-tertiary butyl phenol); a butylated reaction product of para cresol and dicyclopentadiene; a butylated reaction product of meta-para cresol and dicyclopentadiene; butylated, styrenated meta-para cresol; 2,2'-methylene bis (4-methyl-6-tertiary butyl phenol) and styrenated phenol. Of these, 4,4'-butylene bis(3-methyl-6 tertiary butyl phenol) and a butylated reaction product of of para cresol and dicyclopentadiene are preferred.

By neutralizer is meant any compound which will neutralize the oxidation effect of heavy metal ions by such means as sequestering, complexing, chelating, forming insoluble compounds and adsorption. Preferred neutralizers are hydrated metallic silicates, metallic polyphosphates, the sodium and potassium salts of tetraacetic acid ethylenediamine, the sodium and potassium salts of hydroxy triacetic acid ethylenediamine, and silica. Representative examples of the (b) component of the stabilization compounds are hydrated sodium silicate, hydrated potassium silicate, hydrated calcium silicate, tetrasodium pyrophosphate, tetrapotassium pyrophosphate, silica and those specific salts mentioned above.

It has been found that any reducing agent may be employed in the practice of the present invention. Representative examples of the (c) component are organic and inorganic thiosulfates such as sodium benzyl thiosulfate, sodium thiosulfate, potassium thiosulfate and barium thiosulfate and compounds such as sodium phosphite, sodium hypophosphite, sodium sulfite, sodium hydrosulfite, sodium nitrite, stannous chloride, sodium formaldehyde sulfoxylate, thiourea dioxide, sodium pyrosulfite, sodium trihydroxy methoxy aluminate, thiocarbonates, glucose, phenylhydrazine, hydroxylamine, phosphorothioates and organic phosphites such as tris(nonylphenyl) phosphite.

Particularly representative reducing agents are sodium benzyl thiosulfate, sodium thiosulfate, potassium thiosulfate, barium thiosulfate, sodium phosphite, sodium sulfite, and sodium hydrosulfite.

Specifically preferred compositions used in the practice of this invention comprise (a) a butylated reaction product of para cresol and dicyclopentadiene, (b) sodium silicate and (c) sodium thiosulfate; and (a) 4,4'-butylene bis(3-methyl-6-tertiary butyl phenol), (b) sodium silicate, and (c) sodium thiosulfate.

The stabilizing compositions of this invention are useful in protecting polymers against degradation whether the polymer is vulcanized or unvulcanized. They are particularly effective in protecting films, coatings and impregnations deposited from a latex onto a substrate. The stabilization components may be added to the polymer while the polymer is in latex or emulsion form, suspension form, dispersion form or solution form. They may also be added to dry polymer using any of the conventional dry mixing means such as an open mill or an internal mixer. The form in which the stabilization components are added to the polymer latices, suspensions, etc. will depend on such factors as the solubility of the components and whether they are liquids or solids. They may be added directly or put into the form of emulsions, suspensions, dispersions or solutions and then added. Consideration must be given to the latex emulsification system when selecting the components of the antioxidant compositions to avoid the use of materials which will affect the stability of the emulsion. Barium thiosulfate, for example, tends to destroy some, but by no means all, latex emulsification systems. The components of the stabilization compositions may be added to the dry rubber or latex separately, all together, or in any combination and in any order.

The amounts of components of the stabilization composition to be used are from about 0.03 to 5.0 parts of component (a); from about 0.25 to 5.0 parts of component (b), and from about 0.25 to 5.0 parts of component (c), all by weight per 100 parts by weight of rubber. A particularly effective combination, both from the standpoint of economics and degree of protection, has been found to be about 0.0625 part of component (a) with about 0.75 part of component (b) and about 0.50 part of component (c), all parts being by weight based on 100 parts of rubber.

The stabilization compositions described above have been found useful in minimizing deterioration and discoloration of those polymers which are susceptible to deterioration by atmospheric oxygen and/or heat aging and those which are subject to discoloration on aging. Some polymers may be subject to both types of degradation while others will be subject to only one of the types of degradation. The polymers stabilized within the practice of the present invention are natural rubber and the synthetic polymers and copolymers prepared from conjugated dienes as well as the synthetic polymers and copolymers prepared from mono olefins. Representative examples of the synthetic polymers used in the practice of this invention are polychloroprene; polyisoprenes and polybutadienes, and in particular, polyisoprenes and polybutadienes having essentially all of their segmeric units combined in a cis-1,4 structure; copolymers of butadiene and styrene, with or without quantities of other monomers such as unsaturated carboxylic acids, including acrylic, methacrylic, fumaric and itaconic acid; the copolymers of butadiene and acrylonitrile with or without quantities of other monomers such as unsaturated carboxylic acids, which include acrylic, methacrylic, fumaric and itaconic acid; butyl rubber, which is a polymerization product of a major proportion of a mono olefin and a minor proportion of a multiolefin such as butadiene or isoprene; and polymers and copolymers of mono olefins containing little or no unsaturation, such as polyethylene, polypropylene, ethylene propylene copolymers and terpolymers of ethylene, propylene and a nonconjugated diene.

The practice of this invention is found particularly beneficial when applied to the stabilization of natural rubber, polybutadiene, SBR and ABR type latices and polymer deposited therefrom. SBR latices include copolymers of butadiene and styrene with or without quantities of segmers of other monomers such as unsaturated carboxylic acids, including acrylic, methacrylic, fumaric and itaconic acid. ABR latices include copolymers of acrylonitrile and butadiene with or without segmers of other monomers such as styrene or unsaturated carboxylic acids, as mentioned above. The practice of this invention is found most beneficial when applied to the stabilization of latices of copolymers of butadiene and styrene and polymer deposited therefrom.

The practice of this invention will be more fully understood by reference to the following examples which are illustrative rather than restrictive of the scope of the invention.

EXAMPLE 1

Table I, below, shows the results of some 13 experiments in which various levels of 4,4'-butylene bis(3-methyl - 6 - tertiary butyl phenol), hydrated sodium silicate (1.0 $Na_2O$:3.2 $SiO_2$) and anhydrous sodium thiosulfate were added in various combinations and amounts to 250 gram portions of a Pliolite 2001[1] latex possessing a solids content of 40 percent. Although the sodium silicate used was in hydrated form, the parts of sodium silicate listed in Table I were calculated on an anhydrous basis. Unless otherwise stated all of the levels of sodium silicate as shown in the following experiments and examples are calculated on the same basis. No stabilizer was added to to the latex in Experiment 12. One-component stabilizer compositions were added to the latices in Experiments 3, 4, 5 and 10. Two-component stabilization compositions were added to the latices in Experiments 1, 2, 6, 7 and 8. Three-component compositions of the present invention were added to the latices in Experiments 9, 11 and 13.

In these experiments, the phenol, where used, was added as a 40 percent aqueous dispersion; the silicate, where used, was added as a 9.4 percent aqueous solution; and the thiosulfate, where used, was added as a 10 percent aqueous solution. The mixture of latex and stabilizers was then stirred with a propeller type stirrer and strained through a cloth to remove foreign particles such as prematurely coagulated rubber. The latex was then allowed to settle for a few hours to allow air bubbles to separate from the latex. Thirty milliliers of a 5 percent solution of a polyacrylate thickener were then added to the latex. The latex was poured onto a glass plate. A bar was then drawn across the latex to form a layer of latex approximately 0.050 inch in thickness. The latex was allowed to dry overnight to form at latex film. The film was then stripped from the glass plate and dried in an oven for five hours, the temperature being gradually raised from 120° F. to 212° F. to remove any remaining moisture from the film without forming bubbles.

The dried latex films were tested for color, as described below, and then heat aged at 280° F. in an oven for 16 hours. The film was again tested for color after heat aging. The color determinations were made using a General Electric Company Recording Spectrophotometer, Cat. No. 7015E30. The results are shown in Table I. Readings were made by placing a 0.025 inch thick film in the instrument, backing it with white cardboard (having a reflectance of 73 percent at 457 millimicrons) and comparing the film to a magnesium oxide standard to obtain a continuous automatic recording of the percent reflected light. The percent of light reflected at 457 millimicrons was chosen for color comparison. This is the same wave length as that used by Technical Association of the Pulp and Paper Industry (TAPPI) to determine the brightness of paper. This is described in TAPPI Standards, Test Method T452. A highly discolored material will possess a low percent reflectance reading while a material possessing good color will result in a high percent reflectance reading. A typical reflectance recording is shown in the attached figure. In the figure at a wave length of 457 millimicrons an unaged latex film stabilized with a three-component composition of the present invention (curve X) has a percent transmittance reflectance of 53.5 percent. The unstabilized, aged latex film (curve Z) has a value of 7 percent. The aged, stabilized latex film (curve Y) has a value of 46 percent. It will be noted that percent reflectance differences between the aged stabilized film (curve Y) and aged unstabilized film (curve Z) are large over a wide range of wave lengths.

TABLE I

| Experiment | 4,4'-butylene bis(3-methyl-6-tertiary butyl phenol), parts[1] | Sodium silicate, parts | Sodium thio sulfate, parts | Reflection reading, percent reflectance | |
|---|---|---|---|---|---|
| | | | | Original | Heat aged |
| 1 | 1.0 | 0.75 | 0 | 56.5 | 29.5 |
| 2 | 1.0 | 0 | 0.50 | 58.5 | 30 |
| 3 | 3.0 | 0 | 0 | 57.5 | 8 |
| 4 | 0 | 3.0 | 0 | 60 | 10.5 |
| 5 | 0 | 0 | 2.0 | 59 | 10.5 |
| 6 | 2.0 | 1.5 | 0 | 59 | 28.5 |
| 7 | 2.0 | 0 | 1.0 | 58 | 32.5 |
| 8 | 0 | 3.0 | 2.0 | 59.5 | 19.5 |
| 9 | 1.0 | 0.75 | 0.50 | 58.5 | 50 |
| 10 | 1.0 | 0 | 0 | 58 | 8 |
| 11 | 1.0 | 0.25 | 0.125 | 60 | 28 |
| 12 | 0 | 0 | 0 | 59.5 | 7 |
| 13 | 0.125 | 0.25 | 0.25 | 61 | 27 |

[1] Parts are based by weight on 100 parts by weight of latex solids. Unless otherwise stated all parts shown in the following experiments and examples are on this same basis.

The above data indicate that the three-component composition reduces the amount of color formation on heat aging. It should be noted that when the components of the ternary mixture are used individually (Experiments

---

[1] A polymer with a bound styrene content of about 46 percent and a bound butadiene content of about 54 percent possessing a large Mooney plasticity of about 40, and polymerized using a disproportionated rosin soap emulsification system. The disproportionated rosin soap is the potassium salt of the product of a catalytic disproportionation reaction between hydrogen and the alicyclic hydrocarbon acids, a major component of which is abietic acid, obtained from wood rosin.

3, 4, 5 and 10) or in pairs (Experiments 1, 2, 6, 7 and 8) the color formation on aging is greater than when the ternary composition (Experiments 9, 11 and 13) is used. This is true even when large amounts of the individual materials or dual combinations are used. The data therefore illustrate a synergistic effect. By using the three-component composition of the present invention about 40 percent more light is reflected after aging than when an abnormally large quantity of any one of the components alone is used. This is shown in Table I by comparing Experiments 3, 4 or 5 against Experiment 9.

EXAMPLE 2

In Table II below are shown results obtained with other stabilization compositions used with Pliolite 2001. The samples were prepared and tested in the manner described in Example 1. Experiments 14 through 18 illustrate the advantages obtained by the use of the three-component system of this invention as compared to Experiments 19 and 20 in which a two-component system is used.

No stabilizer was added to the latex of Experiment 21. One-component stabilizer compositions were added to the latices of Experiments 22, 26 and 27. A two-component stabilizer composition was added to the latex of Experiment 23. Three-component compositions of the present invention were added to the latices of Experiments 24, 25 and 28. The latex films of Experiments 21 through 26 were unvulcanized while the latex films of Experiments 27 and 28 were compounded with an aqueous dispersion of the ingredients shown below and vulcanized for 20 minutes at 250° F. The aqueous dispersion was added in the amount of 13.5 grams per 100 grams of latex solids.

| Ingredients: | Parts by weight |
| --- | --- |
| Sulfur | 8.9 |
| Zinc oxide | 37.0 |
| Zinc diethyl dithiocarbamate | 3.7 |
| Zinc salt of 2-mercaptobenzothiazole | 1.6 |
| Sodium salt of sulfonated naphthalene | 0.5 |
| Dialkyl sulfonated succinate | 0.06 |
| Water | 48.8 |

TABLE II

| Experiment | 4,4'-butylene bis(3-methyl-6-tertiary butyl phenol), parts | Miscellaneous components, parts | Reflection reading, percent reflectance | |
| --- | --- | --- | --- | --- |
| | | | Original | Heat aged |
| 14 | 1.0 | 0.75 sodium triacetic hydroxyethyldethylene diamine and 0.50 sodium thiosulfate | 58.5 | 36.5 |
| 15 | 1.0 | 1.0 hydrated calcium silicate+1.0 sodium benzyl thiosulfate | 60 | 34 |
| 16 | 1.0 | 1.0 hydrated calcium silicate and 0.50 sodium thiosulfate | 55 | 33 |
| 17 | 1.0 | 0.75 sodium silicate and 1.0 sodium benzyl thiosulfate | 60 | 43.5 |
| 18 | 1.0 | 0.75 tetrasodium pyrophosphate and 0.50 sodium thiosulfate | 57 | 43.5 |
| 19 | 1.0 | 0.75 sodium benzyl thiosulfate | 57.5 | 13.5 |
| 20 | 1.0 | 0.75 hydrated calcium silicate | 59.5 | 22 |

Table III shows that in Experiment 21, where no oxidation inhibitor was added, the film absorbed 1.0 percent

TABLE III

| Experiment | 4,4'-butylene bis(3-methyl-6-tertiary butyl phenol), parts | Sodium silicate, parts | Hydrated calcium silicate, parts | Sodium thiosulfate, parts | Anhydrous sodium benzyl thiosulfate, parts | Percent O₂ absorbed | | | |
| --- | --- | --- | --- | --- | --- | --- | --- | --- | --- |
| | | | | | | 0.10, hrs. | 0.25, hrs. | 0.50, hrs. | 1.00, hrs. |
| 21 | | | | | | | | | 47 |
| 22 | 1.0 | | | | | | | 205 | 480 |
| 23 | | 0.75 | | 0.50 | | | | 84 | 124 |
| 24 | 1.0 | 0.75 | | 0.50 | | | | 205 | 430 | 1,200 |
| 25 | 1.0 | | 1.0 | | 1.0 | 160 | 285 | 1,100 | (¹) |
| 26 | 3.0 | | | | | | | | 484 |
| 27 | 1.0 | | | | | | | 295 | 445 |
| 28 | | 0.75 | | 0.50 | | | | 450 | >1,200 |

¹ Infinity.

EXAMPLE 3

The use of the stabilization compositions of this invention to protect polymers against degradation by oxidation is illustrated by the test results reported in Table III, below, which were obtained using a modified Warburg type apparatus to determine the percent absorption of pure oxygen gas at elevated temperatures.

The stabilization components listed in Table III were added to Pliolite 2001 latex and films were cast and dried in the same manner as described in Example 1. The age resisting effectiveness of the mono-, di- and tri-component compositions was evaluated by conducting oxygen absorption tests at 90° C. on the dried latex film samples. Two and one-half gram samples of film were placed in the oxygen absorption apparatus. The air was flushed out and replaced by pure oxygen. Also, 3.0 grams of calcium oxide were used to absorb any water vapor and carbon dioxide that may have formed during the degradation since such materials might result in misleading oxygen volume readings. The volume of oxygen absorbed was measured daily and the absorption allowed to continue until the volume absorbed amounted to one percent of the weight of the latex film. A latex film is highly degraded by the absorption of one percent oxygen, as evident from its resulting gross physical deterioration. The procedure used to conduct this test is described in detail in Industrial and Engineering Chemistry, 43, p. 456 (1951), and in Industrial and Engineering Chemistry, 45, p. 392 (1953).

oxygen in 47 hours, whereas the latex film of Experiment 22, with 1.0 part of 4,4'-butylene bis(3-methyl-6-tertiary butyl phenol) added, required 480 hours to absorb 1.0 percent O₂. In Experiment 23, where sodium silicate and sodium thiosulfate were added, but no phenolic antioxidant added, 1.0 percent was absorbed in 124 hours, an interval larger than in Experiment 21, but less than in Experiment 22. This demonstrates that this combination of the silicate and the thiosulfate has antioxidant properties but is less effective than the alkylated bisphenol. When all three components are used together, as shown in Experiment 24, the time required to absorb 1.0 percent O₂ by weight is 1200 hours, a time greater than the sum of the individual components. Even by increasing the level of phenolic antioxidant (Experiment 26) to 3.0 parts, the degree of protection provided by the ternary system is not attained. This illustrates the synergistic effect of the system in providing protection against polymer degradation. Experiments 27 and 28 in Table III show that in sulfur cured latex films an improvement in oxidation resistance occurs by using the ternary system as compared to using the phenolic antioxidant alone. In addition, No. 28 gave about the same protection as in Experiment 24, its counterpart without sulfur curing, showing that sulfur curing has no deleterious effect on oxygen degradation resistance.

EXAMPLE 4

Table IV shows the effect of various levels of 4,4'-butylene bis(3-methyl-6-tertiary butyl phenol) in protecting Pliolite 2001 latex films against heat aged discoloration when 0.75 part of sodium silicate and 0.50 part of sodium thiosulfate are present. The samples were prepared, aged and tested in the same manner as described in Example 1.

TABLE IV

| Experiment | 4,4'-butylene bis(3-methyl-6-tertiary butyl phenol), parts | Sodium silicate, parts | Sodium thiosulfate, parts | Reflection reading, percent reflectance | |
|---|---|---|---|---|---|
| | | | | Original | Heat aged |
| 29 | 1.0 | 0.75 | 0.50 | 60 | 50 |
| 30 | 0.25 | 0.75 | 0.50 | 59 | 49 |
| 31 | 0.12 | 0.75 | 0.50 | 59 | 48 |
| 32 | 0.06 | 0.75 | 0.50 | 59 | 47 |
| 33 | 0.03 | 0.75 | 0.50 | 59 | 27 |

The results shown in Table IV indicate that even with extremely small amounts of the phenol component (Experiments 32 and 33) protection against discoloration is obtained. The results are particularly significant in view of the fact that while small amounts of phenol will provide this improvement the total absence of phenol (Table I, Experiment 8) provides a much lower level of protection even if the other ingredients are used in substantially higher amounts. The ability to achieve this level of stabilization with very small amounts of phenolic antioxidant is not only advantageous from a technical standpoint but also provides the advantage of low cost.

EXAMPLE 5

Table V shows the effect of adding one part of various phenolic antioxidants to Pliolite 2001 latex. Each sample also contains 0.75 part sodium silicate and 0.50 part sodium thiosulfate not shown in the Table. The antioxidants were added either as emulsions of finely subdivided water dispersions. With the exception of Experiment 41, the phenolic antioxidant was the last ingredient to be added. The samples were prepared, aged and tested in the same manner as described in Example 1.

TABLE V

| Experiment | Antioxidant | Reflection reading, percent reflectance | |
|---|---|---|---|
| | | Original | Heat aged |
| 35 | 1.0 part 4,4'-butylene bis (3-methyl-6-tertiary butyl phenol) | 60 | 50 |
| 36 | 1.0 part butylated reaction product of p-cresol and dicyclopentadiene | 58 | 45 |
| 37 | 1.0 part butylated, styrenated, m,p-cresol | 60 | 48 |
| 38 | 1.0 part 2,2'-methylene bis(4-methyl-6-tertiary butyl phenol) | 58 | 42 |
| 39 | 1.0 part styrenated phenol | 60 | 46 |
| 40 | 1.0 part styrenated phenol+0.5 part 2,2'-methylene bis (4-methyl-6-tertiary butyl phenol) | 58 | 43 |
| 41 | 1.0 part 4,4'-butylene bis (3-methyl-6-tertiary butyl phenol)-(added before silicate and thiosulfate) | 60 | 51 |

The above data indicate that phenolic antioxidants in general operate effectively within the present synergistic system. A comparison of Experiments 35 and 41 also indicates that the order of addition of the synergists is not controlling.

Latices stabilized in this manner have various uses, including coating or impregnating substrates such as paper, fabrics or asbestos. When water-insoluble components are used to protect against discoloration and oxidation, as disclosed herein, the latices can be added to a pulp slurry before sheet forming, by the beater addition technique, to form various latex impregnated paper and asbestos products.

The following example illustrates the excellent performance of a paper saturated with a latex, containing a stabilizing composition according to the present invention.

EXAMPLE 6

A 36 pound crepe paper (500 sheets, 24" x 36"=36 lbs.) was dipped in Pliolite 2001 latices prepared in the manner described in Example 1 and stabilized with the ingredients shown in Table VI. Each ten gram sheet of paper absorbed approximately ten grams of latex solids, forming a finished sheet containing 50 percent latex solids. The samples were then aged by heating in an air circulating oven at a temperature of 212° F. The results are listed in Table VI.

A one-component stabilizer composition comprising (A), 4,4'-butylene bis(3-methyl-6-tertiary butyl phenol), was added to the latex of Example 45. Three-component stabilization compositions of the present invention were added to the latices of Experiments 42, 43 and 44. Each of the latter three compositions comprised (A) 4,4'-butylene bis(3-methyl-6-tertiary butyl phenol); (B) hydrated sodium silicate, and (C) anhydrous sodium thiosulfate.

TABLE VI

| Experiment | (A), parts | (B), parts | (C), parts | Aging test results at 212° F. | | |
|---|---|---|---|---|---|---|
| | | | | 48 hrs. | 72 hrs. | 96 hrs. |
| 42 | 0.06 | 1.0 | 1.0 | Flexible | Stiffened | Stiffened. |
| 43 | 1.0 | 1.0 | 1.0 | do | Flexible | Flexible. |
| 44 | 3.0 | 1.0 | 1.0 | do | do | Do. |
| 45 | 3.0 | 0 | 0 | Stiffened | Stiffened | Stiffened. |

The papers in both Experiments 43 and 44 were flexible after 96 hours and possessed only a slight degree of brown discoloration. The paper in both Experiments 42 and 45 were discolored after 96 hours and were stiffened before the 96 hour period expired. It should be noted, however, that the paper of Experiment 42 whose latex solids portion was stabilized with a composition according to the present invention and contained only 0.06 part of phenolic antioxident, remained flexible after 48 hours, while Experiment 45, being stabilized only with three parts of 4,4'-butylene bis(3-methyl-6-tertiary butyl phenol) stiffened before the 48 hour period expired. These data demonstrate that the stabilization compositions of the present invention offer superior aging resistance to latex saturated paper.

Latex is sometimes blended with clays and other relatively nondiscoloring fillers. The stabilization compositions of the present invention afford protection against discoloration to films made from these loaded latices as well as the unloaded latices.

EXAMPLE 7

Two hundred and fifty grams of Pliolite 2001 latex were blended with 46 grams of a 65 percent solids content blend of 80/20 clay/titanium dioxide slurry. A very white and opaque dried latex film was cast from this blend. The latex was stabilized with the ingredients listed in Table VII and in the manner described in Example 1 prior to the formation of the latex film. The films were heat aged and tested according to the method described in Example 1 except that a white reflecting backing was not needed due to the opacity of the film. A one-component stabilization composition was added to the latex of Experiment 46. A three-component stabilization composition of the present invention was added to the latex of Experiment 47.

TABLE VII

| Experiment | 4,4'-butylene bis(3-methyl-6-tertiary butyl phenol), parts | Sodium silicate, parts | Sodium thiosulfate, parts | Reflection reading, percent reflectance | |
|---|---|---|---|---|---|
| | | | | Original | Heat aged |
| 46 | 1.0 | 0 | 0 | 78 | 30 |
| 47 | 1.0 | 0.75 | 0.50 | 76 | 71 |

The data in Table VII demonstrate the effectiveness of the present stabilization composition even in latex films containing nondiscoloring fillers.

EXAMPLE 8

Two stabilized natural rubber latex films were prepared from a high ammonia stabilized natural rubber latex possessing a solids content of 62.5 percent and aged in the same manner as described in Example 1. Qualitative evaluations are noted below.

TABLE VIII

| Experiment | 4,4'-butylene bis (3-methyl-6-tertiary butyl phenol), parts | Sodium silicate, parts | Sodium thiosulfate, parts |
|---|---|---|---|
| 48 | 1.0 | | |
| 49 | 1.0 | 0.75 | 0.50 |

The latex film of Experiment 48 after aging (16 hours at 280° F.) was very tacky such that it actually flowed at room temperature. This indicates degradation in the form of chain scission. The latex film of Experiment 49 containing a stabilizing composition of the present invention showed very little, if any, deterioration.

EXAMPLE 9

In Table IX below are shown results obtained with stabilization systems containing other reducing agents than described earlier herein. The samples were prepared and tested in the manner described in Example 1 using Plioflex 2001. Experiments 53 through 58 illustrate again the advantages obtained by the use of the three-component system of the invention as compared to an unstabilized material (Experiment 50), a one-component system (Experiment 51) and a two-component system (Experiment 52).

The above data demonstrate that various reducing agents may be used effectively within the scope of the present invention.

EXAMPLE 10

Table X shows the effect of various levels of 4,4'-butylene bis(3-methyl-6-tertiary butyl phenol) in protecting Pliolite 2001 latex films against degradation by oxygen when 0.75 part of sodium silicate and 0.50 part of sodium thiosulfate are present (Experiments 59–63).

TABLE X

| Experiment | 4,4'-butylene bis (3-methyl-6-tertiary butyl phenol), parts | Sodium silicate, parts | Sodium thiosulfate, parts | Hrs. to 1% $O_2$ absorption |
|---|---|---|---|---|
| 59 | 1.00 | 0.75 | 0.50 | 1,075 |
| 60 | 0.50 | 0.75 | 0.50 | 1,065 |
| 61 | 0.25 | 0.75 | 0.50 | 1,075 |
| 62 | 0.12 | 0.75 | 0.50 | 885 |
| 63 | 0.06 | 0.75 | 0.50 | 1,080 |

The above data reveal that even with extremely small amounts of the phenol component protection against oxidation degradation is obtained. These results are particularly significant in view of the results obtained with high levels of the phenolic component (Table III, Experiment 26) and a phenol-free system (Table III, Experiment 23).

EXAMPLE 11

Table XI shows the use of reducing agents other than sodium thiosulfate (Experiments 65 and 66) in the three-component system of the present invention in Plioflex 2001.

TABLE XI

| Experiment | 4,4'-butylene bis(3-methyl-6-tertiary butyl phenol), parts | Sodium silicate, parts | Sodium thiosulfate, parts | Sodium sulfite, parts | Sodium hydrosulfite, parts | Hrs. to 1% absorbtion |
|---|---|---|---|---|---|---|
| 64 | | 0.75 | 0.50 | | | 101 |
| 65 | 1.0 | 0.75 | | 0.50 | | 885 |
| 66 | 1.0 | 0.75 | | | 0.50 | 930 |

The above data demonstrate the effectiveness of reducing agents other than sodium thiosulfate when used within the practice of the present invention.

EXAMPLE 12

A potassium salt of disproportionated rosin acid was heat aged two hours at 300° F. with a one-component system (Experiment 67) and a three-component system (Experiment 68) of the present invention. The materials were added to the soap which was in a 40 percent active aqueous solution. The mixture was smeared on a glass plate and dried at 160° F. to 180° F. Samples were also prepared for $O_2$ absorption testing by using the crumbled dried soap above.

TABLE IX

| Experiment | 4,4' butylene bis(3-methyl-6-tertiary butyl phenol) | Sodium silicate | Sodium thiosulfate | Tris(nonyl phenyl) phosphite | Sodium phosphite | Sodium hypophosphite | Sodium sulfite | Sodium hydrosulfite | Reflection reading, percent reflectance Original | Heat aged |
|---|---|---|---|---|---|---|---|---|---|---|
| 50 | | | | | | | | | 61.0 | 8.0 |
| 51 | | 0.75 | | | | | | | 66.0 | 8.0 |
| 52 | 1.0 | | | | | 0.50 | | | 65.0 | 27.3 |
| 53 | 1.0 | 0.75 | | | | 0.50 | | | 67.7 | 51.8 |
| 54 | 1.0 | 0.75 | 0.50 | | | | | | 62.5 | 52.0 |
| 55 | 1.0 | 0.75 | | | | | 0.50 | | 62.5 | 31.0 |
| 56 | 1.0 | 0.75 | | | | | | 0.50 | 63.9 | 51.6 |
| 57 | 1.0 | 0.75 | | 0.50 | | | | | 61.6 | 50.8 |
| 58 | 1.0 | 0.75 | | | | | | 0.50 | 64.0 | 41.0 |

TABLE XII

| Experiment | 4,4'-butylene bis(3-methyl-6-tertiary butyl phenol), parts | Sodium silicate, parts | Sodium thiosulfate, parts | Heat aged color | Hrs. to 1% $O_2$ absorption |
|---|---|---|---|---|---|
| 67 | 1.0 | | | Dark | 1 |
| 68 | 1.0 | 0.75 | 0.50 | Light | 3.9 |

The above data reveal that the three-component system offers a greater degree of protection against discoloration and O₂ absorption than the phenol alone.

Rosin acid and unsaturated fatty acid soaps are highly subject to discoloration on heat aging. The system of the present invention offers protection against this type of degradation.

The stabilizing advantages offered by the system of the present invention are much more pronounced when the stabilized environment is in an alkaline condition, such as in a polymer containing an unsaturated fatty acid and/or rosin acid soap.

EXAMPLE 13

Table XIII shows the usage of still another neutralizer, silica, (Experiment 70) as ea member of the three-component stabilization system of the present invention. The silica was added in the form of a slurry. A control, Experiment 69, was tested along with the system containing silica.

TABLE XIII

| Experiment | 4,4'-butylene bis(3-methyl-6-tertiary phenol), parts | Sodium silicate, parts | Silica, parts | Sodium thio-sulfate, parts | Reflection reading, percent reflectance | |
|---|---|---|---|---|---|---|
| | | | | | Original | Heat aged |
| 69 | 1.0 | 0.75 | | 0.50 | 64 | 51 |
| 70 | 1.0 | | 0.75 | 0.50 | 65 | 44 |

The above data indicate that silica operates effectively when substituted for sodium silicate in the stabilization system of the present invention.

Latices stabilized in the manner described herein may be used in the production of foamed rubber products so as to provide foamed rubber products with enhanced oxidation and discoloration resistance. These foamed products are generally made by whipping air into a rubber latex to which curatives, antioxidants, pigments, gelling agents, etc. are added, causing the foam to gel or set and heating to cure the rubber product.

The scope of the invention includes in addition to the stabilizing compositions, polymers, latices and stabilized rubber products described in the above working examples, all those previously disclosed in the specification.

Overall, the data presented demonstrate that a new synergistic stabilizer composition has been found for polymer in latex form, polymer deposited from said latex, unvulcanized polymer and vulcanized polymer which protects them from both oxygen degradation and discoloration.

While certain representative embodiments and details have been shown for the purpose of illustrating the invention it will be apparent to those skilled in this art that various changes and modifications may be made therein without departing from the spirit or scope of the invention.

What I claim is:

1. A composition comprising (a) at least one phenolic antioxidant, (b) at least one neutralizer that will neutralize the effect of heavy metal ions, and (c) at least one reducing agent.

2. The composition according to claim 1 wherein component (b) is at least one material selected from the group consisting of hydrated metallic silicates, metallic polyphosphates, the sodium salt of tetraacetic acid ethylenediamine, the potassium salt of tetraacetic acid ethylenediamine, the sodium salt of hydroxy triacetic acid ethylenediamine, the potassium salt of hydroxy triacetic acid ethylene diamine and silica, and wherein component (c) is at least one material selected from the group consisting of organic thiosulfates, inorganic thiosulfates, and organic phosphites.

3. The composition according to claim 1 wherein component (a) is selected from the group consisting of 4,4'-butylene bis(3-methyl-6-tertiarybutyl phenol); a butylated reaction product of para cresol and dicyclopentadiene; a butylated reaction product of meta-para cresol and dicyclopentadiene; butylated, styrenated meta-para cresol; 2,2'-methylene bis(4-methyl-6-tertiarybutyl phenol) and styrenated phenol.

4. The composition according to claim 1 wherein component (b) is selected from the group consisting of hydrated sodium silicate, hydrated potassium silicate, hydrated calcium silicate, tetrasodium pyrophosphate, tetrapotassium pyrophosphate, the sodium salt of tetraacetic acid ethylenediamine, the potassium salt of tetraacetic acid ethylenediamine, the sodium salt of hydroxy triacetic acid ethylenediamine, the potassium salt of hydroxy triacetic acid ethylenediamine and silica and wherein component (c) is selected from the group consisting of sodium benzyl thiouslfate, sodium thiosulfate, potassium thiosulfate, barium thiosulfate, sodium phosphite, sodium hypophosphite, sodium sulfite, sodium hydrosulfite, sodium nitrite, stannous chloride, sodium formaldehyde sulfoxylate, thiourea dioxide, sodium pyrophosphite, sodium trihydroxy methoxy aluminate, thiocarbonates, glucose, phenyl hydrazene, hydroxylamine, tris(nonylphenyl) phosphite and phosphorothioates.

5. The composition according to claim 4 wherein component (c) is selected from the group consisting of sodium benzyl thiosulfate, sodium thiosulfate, potassium thiosulfate, barium thiosulfate, sodium phosphite, sodium sulfite and sodium hydrosulfite.

6. A composition according to claim 1 wherein the weight ratio of (a)/(b)/(c) is 0.03 to 5.0/0.25 to 5.0/0.25.

7. A composition according to claim 6 wherein component (a) is 4,4'-butylene bis(3-methyl-6-tertiarybutyl phenol), component (b) is hydrated sodium silicate and component (c) is sodium thiosulfate.

8. A composition according to claim 6 wherein component (a) is the butylated reaction product of para cresol and dicyclopentadiene, component (b) is hydrated sodium silicate and component (c) is sodium thiosulfate.

9. A polymer selected from the group consisting of natural rubber; terpolymers of ethylene, propylene and a non-conjugated diene; and synthetic homopolymers and copolymers selected from the group consisting of homopolymers of conjugated dienes, homopolymers of mono olefins, cooplymers of conjugated dienes with one another, copolymers of mono olefins with one another and copolymers of conjugated dienes with mono olefins and stabilized with a composition according to claim 1.

10. The polymer according to claim 9 wherein the polymer is selected from the group consisting of natural rubber; polychloroprene; polyisoprene; polybutadiene; copolymers of butadiene and at least one monomer selected from the group consisting of styrene, acrylonitrile, and unsaturated carboxylic acids; butyl rubber; polyethylene; polypropylene; ethylene propylene copolymers and terpolymers of ethylene, propylene and a nonconjugated diene.

11. The polymer according to claim 9 wherein component (a) is selected from the group consisting of 4,4'-butylene bis(3-methyl-6-tertiarybutyl phenol); a butylated reaction product of para cresol and dicyclopentadiene; a butylated reaction product of meta-para cresol and dicyclopentadiene; butylated, styrenated meta-para cresol; 2,2'-methylene bis(4-methyl-6-tertiarybutyl phenol) and styrenated phenol.

12. The polymer according to claim 9 wherein component (c) is at least one material selected from the group consisting of organic thiosulfates, inorganic thiosulfates, sodium phosphite, sodium hypophosphite, sodium sulfite, sodium hydrosulfite, sodium nitrite, stannous chloride, sodium formaldehyde sulfoxylate, thiourea dioxide, sodium pyrophosphite, sodium trihydroxy methoxy aluminate, thiocarbonates, glucose, phenyl hydrazene, hydroxylamine, and phosphorothioates.

13. The polymer according to claim 9 wherein component (b) is at least one materal selected from the group consisting of hydrated metallic silicates, metallic polyphosphates, the sodium salt of tetraacetic acid ethylenediamine, the potassium salt of tetraacetic acid ethylenediamine, the sodium salt of hydroxy triacetic acid ethylene diamine, the potassium salt of hydroxy triacetic acid ethylenediamine and silica, and wherein component (c) is at least one material selected from the group consisting of organic thiosulfates, inorganic thiosulfates, and organic phosphites.

14. The polymer according to claim 9 wherein component (b) is selected from the group consisting of hydrated sodium silicate, hydrated potassium silicate, hydrated calcium silicate, tetrasodium pyrophosphate, tetrapotassium pyrophosphate, the sodium salt of tetraacetic acid ethylenediamine, the potassium salt of tetraacetic acid ethylenediamine, the sodium salt of hydroxy triacetic acid ethylenediamine, the potassium salt of hydroxy triacetic acid ethylenediamine and silica and wherein component (c) is selected from the group consisting of sodium benzyl thiosulfate, sodium thiosulfate, potassium thiosulfate, barium thiosulfate, sodium phosphite, sodium hypophosphite, sodium sulfite, sodium hydrosulfite, sodium nitrite, stannous chloride, sodium formaldehyde sulfoxylate, thiourea dioxide, sodium pyrophosphite, sodium trihydroxy methoxy aluminate, thiocarbonates, glucose, phenyl hydrazene, hydroxylamine, tris(nonylphenyl) phosphite and phosphorothioates.

15. The polymer according to claim 14 wherein component (c) is selected from the group consisting of sodium benzyl thiosulfate, sodium thiosulfate, potassium thiosulfate, barium thiosulfate, sodium phosphite, sodium sulfite and sodium hydrosulfite.

16. A polymer according to claim 9 containing from 0.03 to 5.0 parts by weight of component (a), 0.25 to 5.0 parts of component (b) and 0.25 to 5.0 parts by weight of component (c) based on 100 parts by weight of polymer.

17. A polymer according to claim 16 wherein component (a) is 4,4'-butylene bis(3-methyl-6-tertiarybutyl phenol), component (b) is hydrated sodium silicate and component (c) is sodium thiosulfate.

18. A polymer according to claim 16 wherein component (a) is the butylated reaction product of para cresol and dicyclopentadiene, component (b) is hydrated sodium silicate and component (c) is sodium thiosulfate.

19. A latex form of a polymer according to claim 9 wherein the polymer is selected from the group consisting of natural rubber, polybutadiene, copolymers of butadiene and at least one material selected from the group consisting of styrene, acrylonitrile, acrylic acid, methacrylic acid, fumaric acid and itaconic acid.

20. A latex according to claim 19 wherein the polymer is a copolymer of butadiene and styrene and wherein the emulsification system for the latex is comprised of a disproportionated rosin soap.

21. A latex according to claim 19 wherein the polymer is a copolymer of butadiene and styrene and wherein the emulsification system for the latex is comprised of an unsaturated fatty acid soap.

22. A substrate treated with the latex form of a polymer according to claim 9.

References Cited

UNITED STATES PATENTS

| | | | |
|---|---|---|---|
| 2,174,545 | 10/1939 | Alexander | 260—5.7 |
| 2,866,807 | 12/1958 | Boyer et al. | 260—461 |
| 3,036,034 | 5/1962 | Rumscherdt | 260—45.7 |
| 3,218,292 | 11/1965 | Horne | 260—45.9 |
| 3,305,522 | 2/1967 | Spacht | 260—45.95 |
| 3,390,111 | 6/1968 | Scullin et al. | 260—23 |
| 3,422,030 | 1/1969 | Riley | 252—400 |
| 2,507,142 | 5/1950 | Chaban | 260—45.7 |
| 2,566,791 | 9/1951 | Chaban | 260—45.75 |
| 2,662,061 | 12/1953 | Gilcrease et al. | 260—45.95 |
| 2,667,522 | 1/1954 | McElroy | 260—45.9 |
| 2,889,307 | 6/1959 | Clayton | 260—45.7 |
| 2,894,924 | 7/1959 | Rockoff | 260—85.1 |
| 3,018,254 | 1/1962 | Kaplan | 260—814 |
| 3,036,138 | 5/1962 | Mingasson et al. | 260—814 |
| 3,062,895 | 11/1962 | Martin et al. | 260—814 |
| 3,073,863 | 1/1963 | Croxall et al. | 260—814 |

FOREIGN PATENTS

| | | |
|---|---|---|
| 816,913 | 7/1959 | Great Britain. |
| 986,504 | 3/1965 | Great Britain. |

OTHER REFERENCES

Wilson et al.: Industrial and Engineering Chemistry, March, 1948, vol. 40, pp. 530–534.

Azorlosa: Industrial and Engineering Chemistry, April 1949, vol. 41, pp. 1626–1629.

DONALD E. CZAJA, Primary Examiner

D. J. BARRACK, Assistant Examiner

U.S. Cl. X.R.

117—161; 252—400; 260—23.5, 23.7, 27, 29.6, 29.7, 45.7, 45.75, 45.85, 45.9, 45.95, 814, 815

PO-1050
(5/69)

UNITED STATES PATENT OFFICE
CERTIFICATE OF CORRECTION

Patent No. 3,535,249      Dated October 20, 1970

Inventor(s) Harry L. Larson

It is certified that error appears in the above-identified patent and that said Letters Patent are hereby corrected as shown below:

Column 4, line 14, "milliliers" should read "milliliters";
        line 19, "at" should read "a";
        Table I, line 69, under "Heat Aged", "27" should read "23"

Column 5, Table II, under "Miscellaneous, parts", "hydroxyethyld-ethylene" should read "hydroxyethylethylene".

Column 10, Table IX, under column headed "original", "65.0" should read "65.5".

Column 11, line 15, "ea" should read "a".

Column 12, line 3, "metal-para" should read "meta-para";
        line 16, "thiouslfate" should read "thiosulfate";
        line 42, after "5.0/0.25", "to 5.0" should be added.
        line 55, "cooplymers" should read "copolymers".

SIGNED AND SEALED
FEB 23 1971

(SEAL)
Attest:

Edward M. Fletcher, Jr.
Attesting Officer

WILLIAM E. SCHUYLER, JR.
Commissioner of Patents